Patented Jan. 10, 1933

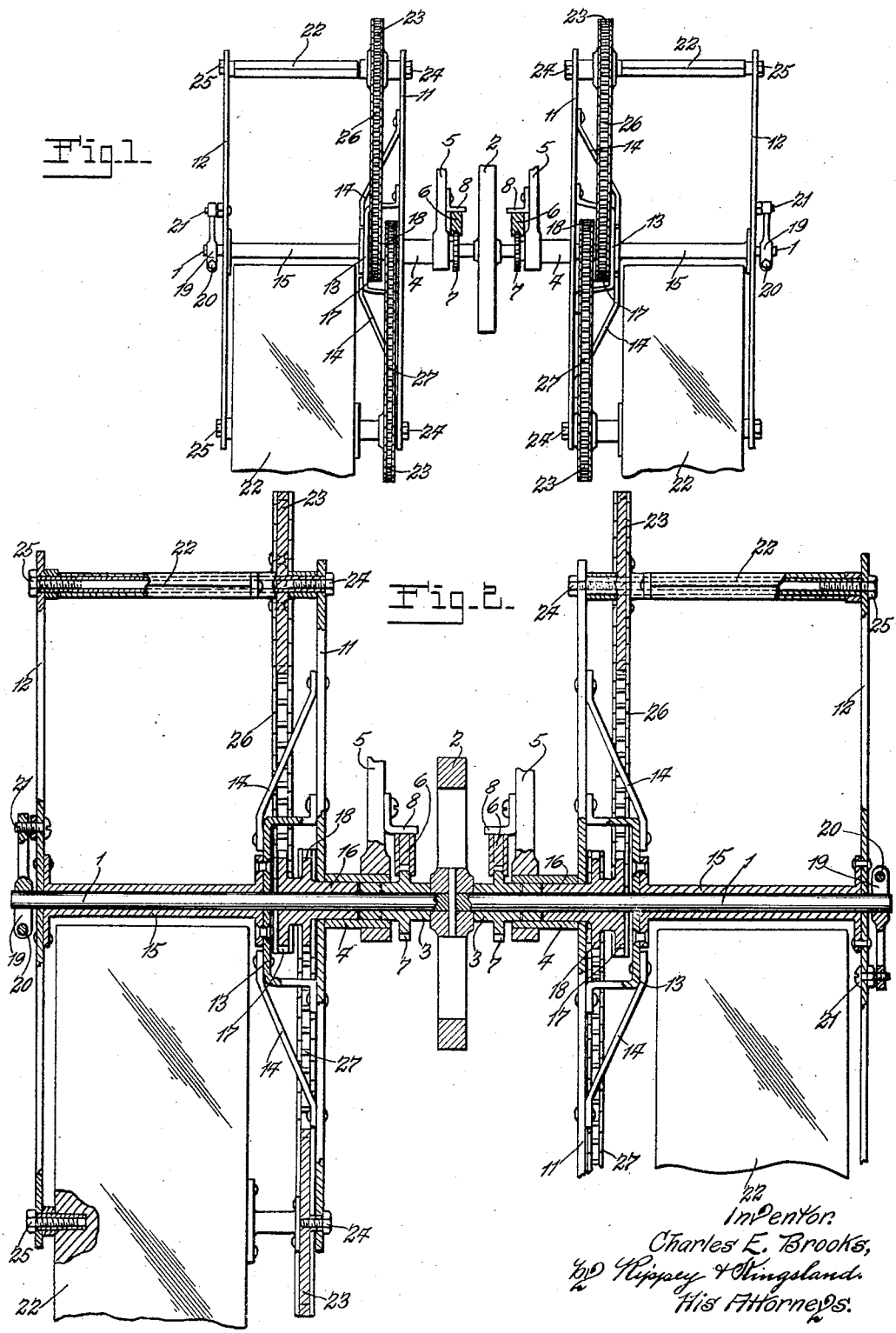

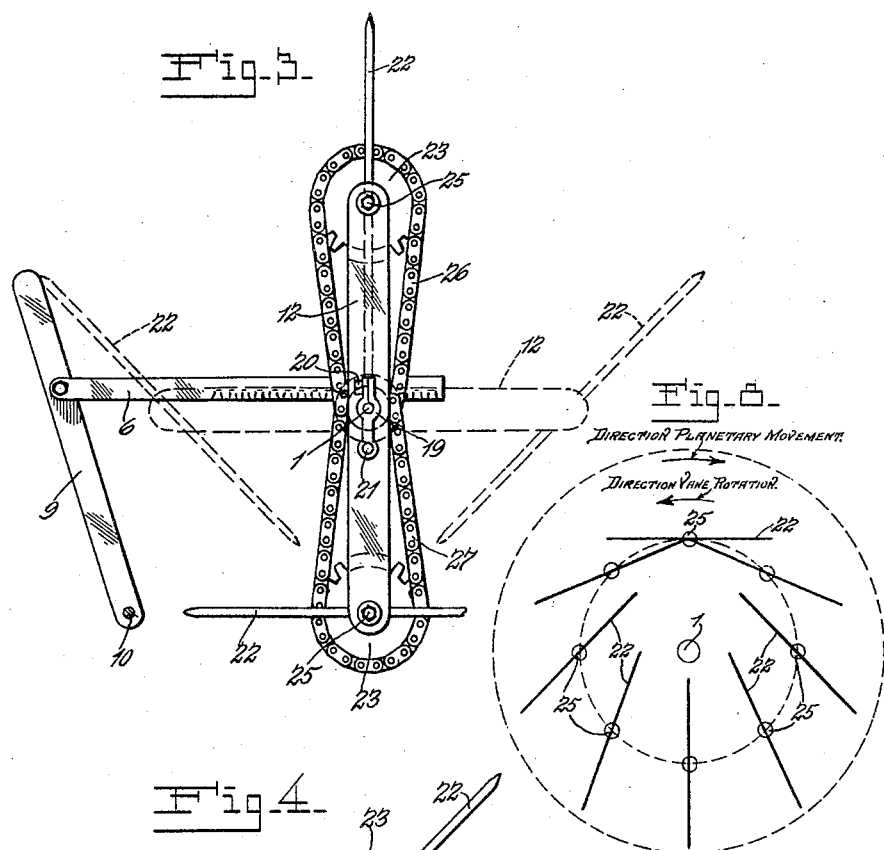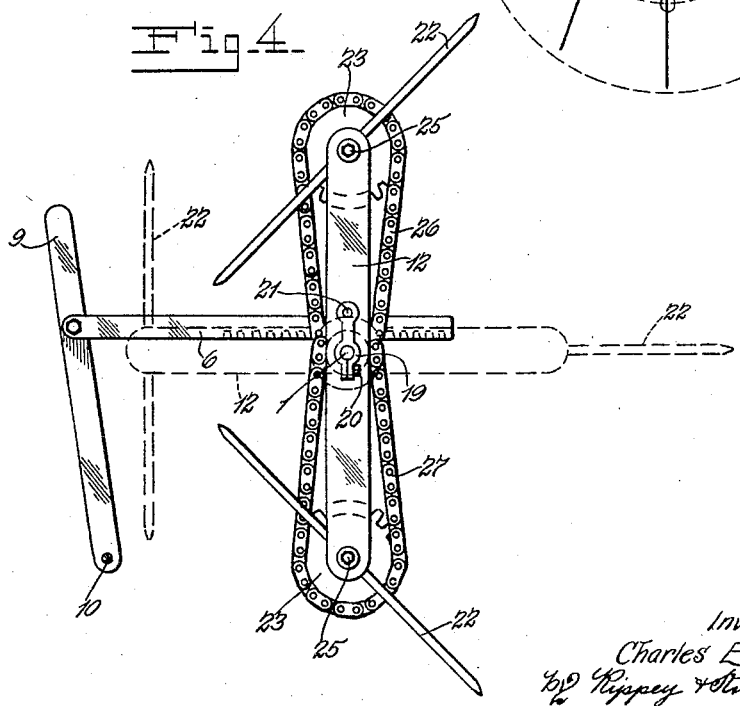

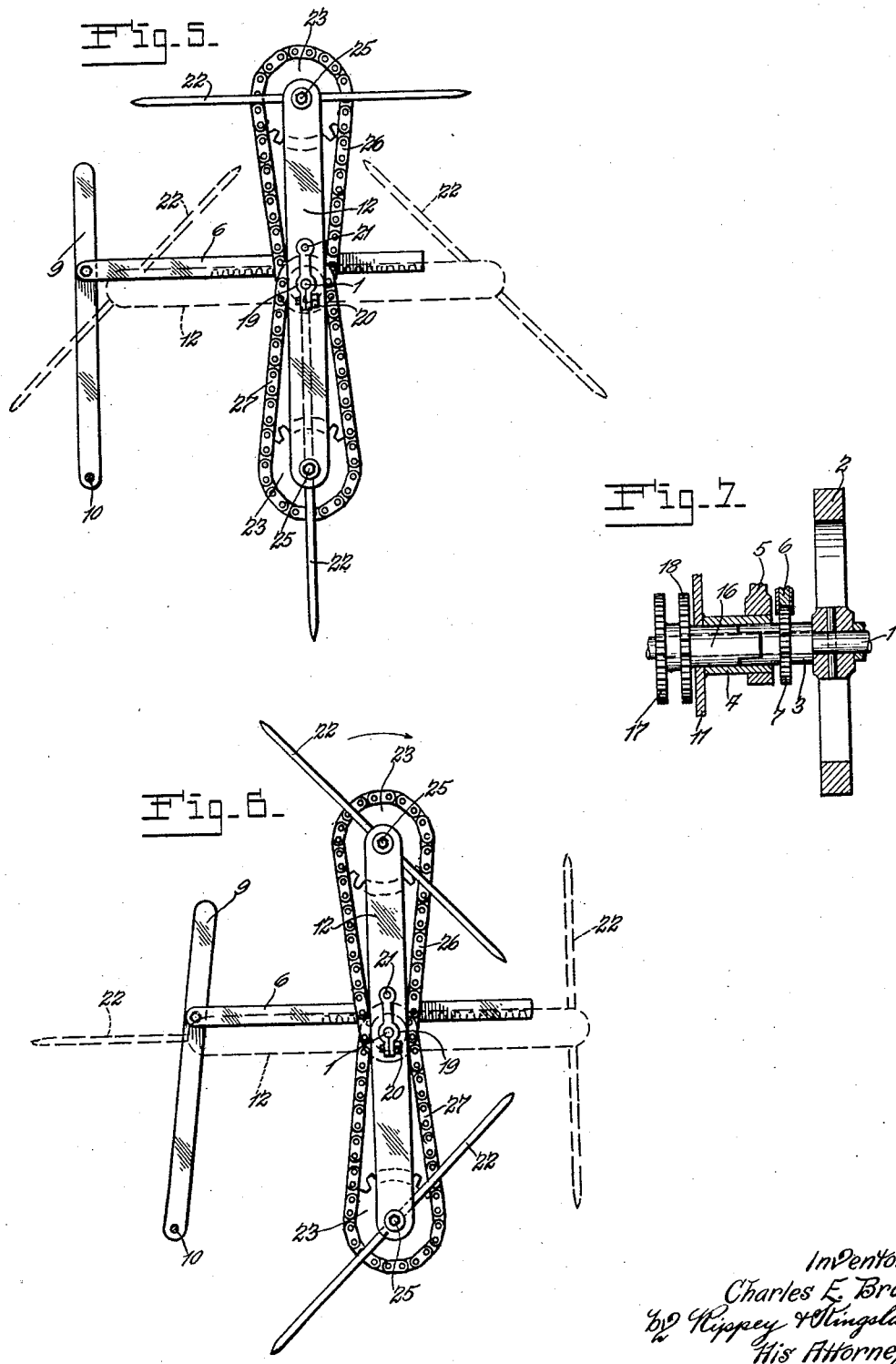

1,894,081

UNITED STATES PATENT OFFICE

CHARLES E. BROOKS, OF ST. LOUIS COUNTY, MISSOURI

PROPELLER

Application filed June 20, 1930. Serial No. 462,492.

This invention relates to propellers; and an object of the invention is to provide an improved propeller designed and adapted specially for use in connection with aircraft, although the invention may well be applied to other uses.

Another object of the invention is to provide an improved propeller comprising a number of vanes supported for rotation about their own axes and for rotation in a planetary manner about a central axis, and mechanism for rotating said vanes in the manner mentioned and at proper angles of incidence with respect to the given radii of the central axis in order to propel an aircraft at widely varying rates of speed, and at widely varying angles of inclination upwardly or downwardly.

Another object of this invention is to provide a propeller for use on aircraft and capable of safe and convenient operation when taking off, in order to utilize the propeller to raise the aircraft from the ground and, at the same time, propel the aircraft forwardly, thereby getting the aircraft into the air and clearing obstructions on the ground in a much shorter distance than can be accomplished by aircraft using the familiar screw propellers. The attainment of this object also enables the propeller to be used safely in landing because the propeller vanes are adjustable to control the speed of forward flight and also to control the rise and descent of the aircraft without changing the position of the central axis about which the propellers rotate in a planetary manner.

Other objects of the invention are to provide a propeller capable of adjustment to control the aircraft in flight in case of tailspin, by changing the position of the vanes to pull the nose of the aircraft forwardly in a manner impossible with screw propellers; to provide means for varying the adjustments of the propeller vanes to obtain better control of the aircraft when passing through downwardly directed air currents such as are often encountered in mountainous territory; and to provide means for controlling the propeller to sustain the aircraft in flight and to cooperate with the wings of the aircraft to sustain the same.

Another object of the invention is to provide a propeller that will obtain a better grip on the air, by mounting the vanes for rotation on their own axes in a frame, and gearing the vanes to a central control gear mounted coaxially with the shaft disposed centrally between the vanes and about which the vanes are rotated in a planetary manner; to equip the construction with mechanism to hold the central gear stationary (except when said gear is moved by hand to change the angle or setting of the vanes); and to provide a construction of the gears whereby the pitch or angles of the vanes as they revolve around the central axis and stationary gear may be changed to positions to constantly grip and push the air in opposite directions from the direction of flight, at any and all radii of a complete circle, the direction of flight being controlled by the setting of the central gear by the operator.

Various other objects and advantages will be apparent from the following description, reference being made to the accompanying drawings, in which—

Fig. 1 is a front or rear elevation showing two of my improved propellers cooperatively associated.

Fig. 2 is a longitudinal sectional view showing the construction and arrangement of the mechanism for operating the propellers.

Fig. 3 is a view showing the propellers arranged to propel the aircraft upwardly and forwardly.

Fig. 4 is a side elevation showing the propellers arranged to reduce the speed of forward flight of the aircraft.

Fig. 5 is a view showing the propeller devices adjusted to propel the aircraft forwardly at approximately maximum speed.

Fig. 6 is a view showing the propellers adjusted to control the descent of the aircraft at reduced speed.

Fig. 7 is a sectional view showing an appropriate clutch for controlling the adjustment of the propeller vanes.

Fig. 8 is a diagrammatic view showing the relative angular positions of the vanes in several of their planetary positions about the central axis.

While I have shown two propellers of duplicate construction associated for simultaneous operation and uniform control, it will be understood that one propeller may be used alone or that any number of propellers may be used according to the needs of the aircraft or other device to which the invention is applied. Accordingly, I do not restrict myself to use of any definite number of propellers in association with each other nor to the use of a single propeller alone.

In the embodiment of the invention shown, the rotary shaft 1 is driven by any suitable connections from a power plant or engine. Driving power may be transmitted to the shaft 1 through a wheel 2 attached to said shaft or by any other appropriate transmission connections.

For each propeller, a clutch member 3 is mounted on the shaft 1. The shaft 1 does not rotate the clutch member 3, but said clutch member 3 is independently rotative on the shaft 1. The clutch member 3 is shown journalled in a bearing 4 supported by a frame 5. A rack 6 is held in constant mesh with a gear wheel 7 which is rigid with the clutch member 3 by a guide 8. The rack 6 is connected with a shift lever 9 pivoted on a support 10. It is now clear that the clutch member 3 may be rotated about the shaft 1 at will by operation of the lever 9, which constitutes a device for operating the clutch member and for preventing the clutch member from accidentally turning or moving from its desired adjustment.

Each propeller comprises an inner frame member 11 and an outer frame member 12 assembled in relatively rigid parallel relationship. A bracket 13 is rigidly attached to the frame member 11 of each propeller and is further strengthened and made rigid by connections 14 having their inner ends rigidly secured to the bracket 13 and their outer ends rigidly secured to the frame member 11. A hub 15 has its inner and outer ends rigidly secured to the bracket 13 and the frame member 12, respectively.

A clutch sleeve 16 is rotatively mounted in the frame member 11 in axial alinement with the hub 15 and is designed and adapted to maintain clutching engagement with the clutch member 3. A pair of sprocket wheels 17 and 18 are rigid on the clutch sleeve 16.

This propeller frame is rigidly secured to the shaft 1 for rotation thereby. A connection for this purpose is shown comprising a clamp 19 arranged to be clamped on the outer end of the shaft 1 by a releasable clamping device 20 and to be attached to the frame member 12 by a releasable fastener 21. Thus, by releasing this clamp device from the shaft 1, the propeller frame may be easily removed and replaced. The clutch sleeve 16 projects into the bearing 4 and into clutching engagement with the clutch member 3 within said bearing. This clutching engagement does not interfere with the free removal and replacement of the propeller.

Each propeller frame supports a pair of propeller vanes or plates. These propeller vanes or plates are rotative about their own axes within the frame and are also rotative in a planetary manner about the axis of the shaft 1. Each vane or plate comprises an elongated member 22 having attached to its inner edge midway of its ends a sprocket wheel 23 rotatively supported by an axle member 24 mounted in one of the ends of the frame member 11. That is, there is one of these sprocket wheels supported at each end of the frame member 11. The outer edge of the vane or plate 22 is rotatively supported by an axle member 25 supported by the frame member 11 in axial alinement with the axle member 24. Thus, the respective vanes or plates 22 are rotative about their own axes comprising the axle members 24 and 25. These axle members 24 and 25 are shown as removable and replaceable members to facilitate and expedite the assembly and dismantling of the invention.

For one of the propeller vanes or plates 22 a sprocket chain 26 is mounted in engagement with the sprocket wheels 17 and 23, and for the other propeller vane or plate a sprocket chain 27 is engaged with the sprocket wheels 18 and 23.

A highly important feature of the invention is the relative arrangement and relationship of the propeller vanes or plates 22 of each propeller. As shown in the different views of the drawings, these propeller vanes or plates are constantly at approximately the angles shown with respect to each other, irrespective of their positions about the axis of the shaft 1 and irrespective of their rapid rotation about their own axes and about the axis of the shaft 1. The angular positions of the propeller vanes or plates of each propeller with respect to the axis of the shaft 1 may be changed almost instantly by operation of the lever 9 and the connections therefrom which operate the clutch member 3 in order to move the chains 26 and 27 by rotation of the sprocket wheels 17 and 18.

When the propeller is in normal operation for straight-ahead flight or for flight along at any angle of inclination from the horizontal, the sprocket wheels 17 and 18 are held in set position and are held from rotation by the clutch member 3 and its connections. For straight horizontal flight, it is possible that the adjustment shown in Fig. 5 may be proper, the propeller frame rotating in a clockwise direction. For upward inclination, perhaps the adjustments in Figs. 3 and 4 may be suitable and, for descent, the approximate adjustment of Fig. 6 may be appropriate. The operator can readily determine the proper adjustments of the propeller vanes during flight though, of course, the relative positions of the propeller vanes or plates cannot be visually observed because of their rapid rotation.

By use of propellers of this type, it is possible to obtain very great speed without increasing the speed of operation of the engine or motor beyond the speed at which the engines or motors are normally operated at the present time to operate propellers of the screw-propeller type and whereby much less speed is obtainable. I am enabled to obtain greater speed under the same conditions of motor operation and to control the direction of the aircraft to vary its altitude or to maintain the aircraft at one altitude by the propeller alone, although I do not restrict myself to the use of the invention in aircraft without the usual aircraft elevators.

This invention provides a propeller operating on a new principle and capable of quick adjustment to different angles or pitch required to control the aircraft either in taking off or during sustained flight, or in landing. A feature to which attention is directed is the relationship of the gears 17 and 18 to the gears 23. The teeth on these gears are of approximately uniform size for proper engagement with the respective chains 26 and 27. The gears 17 and 18 are shown as provided with one-half the number of teeth that are on the gears 23. I have found this to be a highly satisfactory arrangement, but do not restrict the invention thereto. As shown by Fig. 8 of the drawings, the angle of each vane with respect to the radius of its planetary movement varies constantly but has the same position at the same point during every revolution, so that a single setting of the control device is all that is necessary to obtain a predetermined relationship of the vanes.

The invention may be manufactured and installed economically and practicably and is free from unobvious complications. The invention may be varied widely within the scope of equivalent limits without departure from the nature and principle thereof. I do not restrict myself unessentially, but what I claim and desire to secure by Letters Patent is:—

1. In a propeller, a rotary shaft, a sleeve mounted on said shaft, an inner frame member mounted for rotation on said sleeve, a hub mounted on said shaft and rigidly attached to said inner frame member, an outer frame member mounted on said shaft, a hub mounted on said shaft and rigidly attached to said inner and outer frame members, means for rigidly securing said outer frame member to said shaft, propeller vanes rotatively supported between said inner and outer frame members, sprocket wheels rigid with said sleeve, sprocket wheels rigid with said vanes respectively, and sprocket chains connecting said first sprocket wheels with said sprocket wheels that are rigid with said vanes for rotating said vanes automatically and as an incident to rotation of said shaft.

2. A propeller comprising a rotary shaft, two spaced frames, means attaching one of said frames to said shaft, a sleeve mounted on said shaft and supporting the other frame, propeller vanes rotatively supported between said frames, connections for rotating said propeller vanes about their axes by said sleeve, means for rotating said frames by said shaft, and means for rotating said sleeve about the axis of said shaft to vary the angles of inclination of said vanes.

3. A propeller comprising a rotary shaft, mechanism for rotating said shaft, a sleeve rotative about said shaft, a frame supported by said sleeve, a cooperating frame attached to said shaft, propeller vanes rotatively supported between said frames, and mechanism for rotating said sleeve to rotate said propeller vanes relatively while said shaft remains stationary or while said shaft is rotating as desired.

CHARLES E. BROOKS.